United States Patent
Elliot et al.

(10) Patent No.: US 8,944,144 B2
(45) Date of Patent: Feb. 3, 2015

(54) HEATING AND VENTILATION AND/OR AIR CONDITIONING DEVICE WITH A COMPACT CONSTRUCTION FOR A MOTOR VEHICLE PASSENGER COMPARTMENT

(75) Inventors: Gilles Elliot, Courcouronnes (FR); Philippe Pierres, Elancourt (FR); Serge Pouysegur, Le Perray en Yvelines (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 919 days.

(21) Appl. No.: 10/549,257

(22) PCT Filed: Mar. 9, 2004

(86) PCT No.: PCT/IB2004/000790
§ 371 (c)(1),
(2), (4) Date: Sep. 12, 2005

(87) PCT Pub. No.: WO2004/080737
PCT Pub. Date: Sep. 23, 2004

(65) Prior Publication Data
US 2006/0207758 A1 Sep. 21, 2006

(30) Foreign Application Priority Data
Mar. 13, 2003 (FR) ...................... 03 03116

(51) Int. Cl.
*B60H 1/00* (2006.01)
(52) U.S. Cl.
CPC ........ *B60H 1/00542* (2013.01); *B60H 1/00028* (2013.01)
USPC ............... 165/42; 165/43; 165/202; 165/203; 165/204; 454/121; 454/126; 454/156; 454/159; 454/160; 454/161; 62/244

(58) Field of Classification Search
USPC ...................... 165/42, 43, 201, 202, 203, 204; 454/121, 126, 159, 160, 161, 156; 237/12.3 A, 12.3 B; 62/244
See application file for complete search history.

(56) References Cited

U.S. PATENT DOCUMENTS 5,217,405 A * 6/1993 Tanaka ........................... 454/121
5,505,251 A * 4/1996 Sarbach ......................... 165/202

(Continued)

FOREIGN PATENT DOCUMENTS

DE 196 26 441 A1 1/1998
DE 197 39 578 C2 3/1999

(Continued)

OTHER PUBLICATIONS

English translation of the response to Opposition filed in the EPO against European patent No. EP 1 601 543, filed Sep. 17, 2008, 10 pages.

(Continued)

*Primary Examiner* — John Ford
(74) *Attorney, Agent, or Firm* — Howard & Howard Attorneys PLLC (57) ABSTRACT

The heating-ventilation and/or air-conditioning device for a motor vehicle passenger compartment comprises modules grouped substantially at the same horizontal level, namely at least one ventilation module (14) arranged to produce a pulsed air flow, a heating module (12) to be located in a central region of the passenger compartment and having heat exchangers (32, 34, 36) through which the air flow from the ventilation module can pass, and at least one distribution module (16) having an air inlet connected to a side air outlet (46d, 46g) of the heating module. The device of this invention may be installed in a vehicle passenger compartment having no central console.

25 Claims, 6 Drawing Sheets

(56) References Cited

U.S. PATENT DOCUMENTS

| | | | |
|---|---|---|---|
| 5,803,160 A | 9/1998 | Danieau | |
| 6,530,831 B1 | 3/2003 | Colinet | |
| 6,595,276 B2 * | 7/2003 | Bendell et al. | 165/202 |

FOREIGN PATENT DOCUMENTS

| | | | |
|---|---|---|---|
| DE | 100 57 039 A1 | | 6/2001 |
| DE | 100 42 683 A1 | | 3/2002 |
| DE | 100 45 438 A1 | | 3/2002 |
| EP | 0 357 801 A1 | | 3/1990 |
| EP | 0607585 A1 | | 7/1994 |
| EP | 0 458 705 B1 | | 2/1995 |
| EP | 0713798 A1 | | 5/1996 |
| EP | 1510379 A1 | | 3/2005 |
| FR | 2 637 548 A1 | | 4/1990 |
| FR | 2735426 A1 | | 12/1996 |
| FR | 2783465 A1 | | 3/2000 |
| GB | 2049159 A | * | 12/1980 |
| GB | 2332887 A | * | 7/1999 |
| JP | 63016215 U | | 2/1988 |
| JP | 05-1451 U | | 1/1993 |
| JP | 05-76812 U | | 3/1993 |
| JP | H0576812 U | | 10/1993 |
| JP | 05294129 A | * | 11/1993 |
| JP | 06183248 A | * | 7/1994 |
| JP | 06286456 A | * | 10/1994 |
| JP | 08118942 A | * | 5/1996 |
| JP | 09216511 A | * | 8/1997 |
| JP | 11208241 A | * | 8/1999 |
| JP | 11301251 A | * | 11/1999 |
| JP | 2000062438 A | * | 2/2000 |
| JP | 2000085335 A | * | 3/2000 |
| JP | 2001-171332 A | | 6/2001 |
| JP | 2001180251 A | * | 7/2001 |
| JP | 2002019448 A | * | 1/2002 |
| JP | 2002-503579 A | | 2/2002 |
| JP | 2004224081 A | * | 8/2004 |

OTHER PUBLICATIONS

Annex to Communication Opposition in the Opposition of EP 1 601 543, European Patent Office, Feb. 2, 2013, 4 pages.
Decision of the Opposition Division in the Opposition of EP 1 601 543, European Patent Office, Jul. 15, 2013, 11 pages.
English translation of Citation No. 2, Decision of the Opposition Division in the Opposition of EP 1 601 543, European Patent Office, Jul. 15, 2013, 11 pages.
Statement of Grounds of Appeal in the Opposition of EP 1 601 543, submitted to the European Patent Office by the opponent on Nov. 25, 2013, 6 pages.
Statement of Grounds of Appeal in the Opposition of EP 1 601 543, submitted to the European Patent Office by the patent holder on Nov. 26, 2013, 20 pages.
International Search Report for Application No. PCT/IB04/00790, dated Jun. 22, 2004, 3 pages.
English translation of PCT Written Opinion for International Application No. PCT/IB2004/000790, dated Feb. 22, 2006, 5 pages.
English translation of claims as granted for French patent FR 2 852 271, issued Sep. 17, 2004, 7 pages.
English translation of claims as granted for European patent EP 1 601 543, issued May 16, 2007, 7 pages.
Opposition filed in the EPO against European patent EP 1 601 543, filed Feb. 18, 2008, 31 pages.
English translation of a portion of Opposition filed in the EPO against European patent No. EP 1 601 543, filed Feb. 18, 2008, 12 pages.
English language abstract and machine-assisted translation for EP1510379 extracted from the espacenet.com database on Aug. 3, 2002, 18 pages.
English language abstract not available for JP 2002-503579; however, see English language equivalent US 6,530,831, Original Document extracted from the espacenet.com database on Aug. 3, 2002, 25 pages.
English language abstract and machine-assisted translation for JP 2001-171332 extracted from the PAJ database on Aug. 6, 2002, 44 pages.
English language abstract and machine-assisted translation for JP 05-76812 extracted from the PAJ database on Aug. 3, 2002, 29 pages.
English language abstract and machine-assisted translation for JP 05-1451 extracted from the PAJ database on Aug. 3, 2002, 19 pages.
English machine-assisted translation for JP H0576812 extracted from PAJ database on Dec. 13, 2012, 37 pages.

* cited by examiner

HEATING AND VENTILATION AND/OR AIR CONDITIONING DEVICE WITH A COMPACT CONSTRUCTION FOR A MOTOR VEHICLE PASSENGER COMPARTMENT

This invention relates to heating-ventilation and/or air-conditioning devices for motor vehicle passenger compartments.

Devices of this type include means for producing a pulsed air flow with an adjusted temperature, as well as outlets for defrosting, aeration and foot-heating which are supplied by the air flow at an adjusted temperature and which are suitable for being connected to ducts leading into the passenger compartment.

These known devices essentially include a ventilation unit, referred to as a pulser, which is supplied with external air taken from outside the passenger compartment and/or recirculated air from inside the passenger compartment in order to provide a pulsed air flow. This pulsed air flow is then treated by one or more heat exchangers to produce an air flow at an adjusted temperature. These exchangers normally include an evaporator connected to an air-conditioning circuit and a heating radiator through which a coolant fluid passes, with the liquid normally being used to cool the vehicle engine. It is also known to provide, as necessary, an additional electric radiator. The air flow thus treated is then sent, by distribution means, to various outlets, namely defroster/defogger outlets that lead to the base of the windshield, ventilation outlets that essentially lead to the level of the vehicle dashboard and foot-heating outlets that lead to the lower portion of the passenger compartment.

Most known devices include a heat unit that contains the heat exchangers, a mixing chamber for mixing a fresh air flow and a warm air flow in an adjustable proportion so as to obtain an air flow at an adjusted temperature, and distribution means for distributing this air flow among the various outlets leading into the passenger compartment.

These known devices are generally provided in a central position in the passenger compartment, at least partially occupying the console which is located between the floor and the dashboard. The ventilation unit can be placed either in a central position or in a side position. These known devices are adapted to current vehicle designs because the latter comprise a console, as already indicated, which largely enables the components of the device to be housed.

However, vehicle designs are changing and are currently tending toward vehicles that do not comprise a console. Under these conditions, there is no longer a need to design devices that are essentially located in a central position of the passenger compartment and that have a significant vertical height requirement.

The aim of the invention is in particular to overcome the aforementioned disadvantages.

Therefore, an aim of the invention is to propose a heating-ventilation and/or air-conditioning device for the passenger compartment of a motor vehicle, capable of being installed in vehicles with a contemporary design which essentially have no console.

Another aim of the invention is to propose such a device which has a reduced space requirement but satisfactory performance.

To this end, the invention proposes a device as defined in the introduction, which consists of modules grouped substantially at the same horizontal level, including:

- at least one ventilation module arranged to produce a pulsed air flow;
- a heating module designed to be installed in a central region of the passenger compartment and comprising an air inlet for pulsed air, heat exchangers through which the air flow can pass and at least one side air outlet; and
- at least one distribution module with an inlet connected to a side air outlet of the heating module and comprising distribution means for distributing the air flow among air outlets leading into selected areas of the passenger compartment.

Thus, the device of the invention is capable of fitting into a smaller space that extends essentially along a horizontal level.

To this end, the device consists of several modules grouped substantially at the same horizontal level, and is therefore capable of fitting into vehicles without a central console.

The heating module, which, in particular, includes heat exchangers, is located in a central area of the passenger compartment, but above the location traditionally occupied by the console. It is supplied by at least one ventilation module, which is located at the same level. It, in turn, supplies at least one distribution module located substantially at the same horizontal level and next to the heating module. The distribution module(s) comprise(s) distribution means for distributing the air flow among various outlets.

In a preferred embodiment, the heating module comprises two side air outlets opening from the right side and the left side, respectively, and the device includes two distribution modules designed to be installed on the right side and the left side of the heating module, respectively, with each having an inlet connected to a side air outlet of the heating module.

This design of several modules grouped at the same horizontal level results in a device located essentially in the transverse direction (Y-axis) of the vehicle. The ventilation module is located next to the heating module, either in the transverse direction (Y-axis) or the longitudinal direction (X-axis) of the vehicle.

The ventilation module advantageously includes an air inlet unit for outside air and/or recirculated air, a turbine for producing the pulsed air flow, and an outlet channel for leading the pulsed air flow into the heating module.

In a preferred embodiment of the invention, the inlet of the heating module is located in the lower portion, and the heating module houses, from bottom to top, an air-conditioning evaporator and at least one heating radiator.

The heating module preferably houses a first heating radiator through which a heat transfer fluid passes and located above the evaporator, as well as a second electric heating radiator located above the first heating radiator.

The evaporator and the heating radiator can each extend along a plane inclined at an angle between 0° and 90° with respect to the horizontal. The evaporator preferably extends along a plane inclined at an angle between 20° and 40° with respect to the horizontal. However, other orientations can be considered.

In a first general embodiment of the invention, the device includes adjusting means for producing an air flow at an adjusted temperature resulting from a mixture in a variable proportion of a warm air flow that has passed through the heating radiator and a cold air flow that has bypassed the heating radiator. Thus, an "air mixture" adjustment is obtained.

Advantageously, these heating means each include, on the right and left sides, a side channel for warm air passing through a portion of the heating radiator and a side channel for cold air bypassing the side warm air channel, as well as a side mixing flap for distributing the warm air flow in the side warm air channel and the cold air flow in the side cold air channel, in a variable proportion, with the side warm air channel and the cold air channel jointly forming a side outlet of the heating module.

In other words, a mixture of air is thus produced from the right and left sides in order to produce an air flow at an adjusted temperature which is sent into a side outlet of the heating module.

In this embodiment, each side mixing flap can be placed either in the heating module or in a distribution module located on the right or left side of the heating module.

In this first general embodiment of the invention, the adjustment means advantageously include a central channel for the warm air that has passed through a portion of the heating radiator and a central channel for the cold air that has bypassed the central warm air channel, as well as a central mixing flap for distributing, in a variable proportion, the air flow going into the central warm air channel and the air flow going into the central cold air channel, with the two central channels jointly forming a central outlet of the heating module which is arranged to supply at least one other distribution module for distributing an air flow at an adjusted temperature to the rear of the passenger compartment.

In this case, the central mixing module can be located either in the heating module or in the other distribution module.

Advantageously, the adjusting means also include a distribution flap that can be moved between a first position for sending the air flow at an adjusted temperature to the side outlet(s) of the heating module supplying the front of the passenger compartment, and a second position for sending the air flow at an adjusted temperature to the central outlet of the heating module supplying the rear of the passenger compartment.

In a second general embodiment of the invention, the device includes adjusting means acting on the flow, and therefore the temperature, of a coolant passing through the heating radiator in order to produce an air flow at an adjusted temperature. Thus, an "air mixture" adjustment is obtained.

In this second embodiment of the invention, the device advantageously includes two side outlet chambers located downstream of the heating radiator and respectively leading to the side outlets of the heating module.

It can also include at least one cold air side channel for directly leading a cold air flow from the heating module upstream of the heating radiator to a distribution module located on the right or left side.

It is advantageous to also provide a central outlet chamber located downstream of the heating radiator and leading to a central outlet of the heating unit, and arranged to supply at least one other distribution module for distributing an air flow at an adjusted temperature to the rear of the passenger compartment.

In addition, at least one central cold air channel can be provided in order to directly supply a flow of cold air from the heating unit upstream from the heating radiator, to the other distribution module or to a compartment to be cooled.

In a preferred embodiment, the distribution module(s) each have a low outlet leading to the bottom of the passenger compartment, a high outlet leading to the base of the windshield and an intermediate outlet leading to the level of the dashboard.

It is especially advantageous for the modules that form the device of the invention to be integrated in a transverse beam of the vehicle.

In the following description, which is provided only as an example, reference is made to the appended figures, in which.

Figure 1:
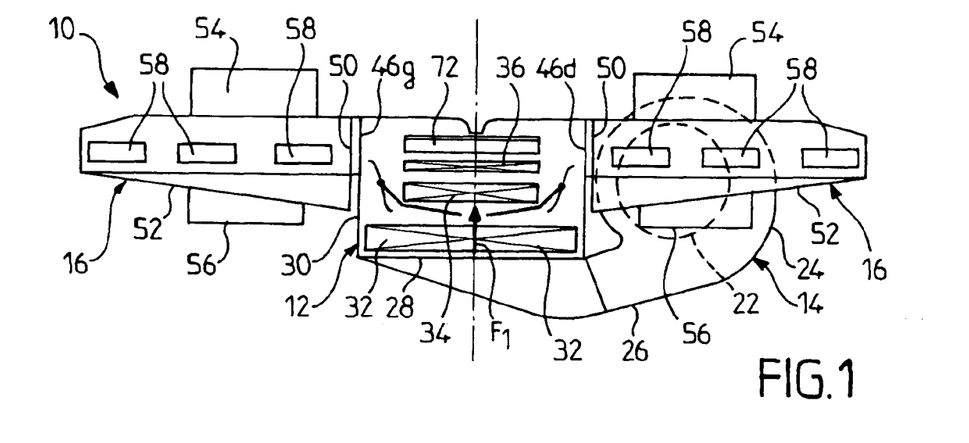
FIG. 1 is a frontal schematic view of a device with a modular structure according to a first embodiment of the invention.
Figure 3:
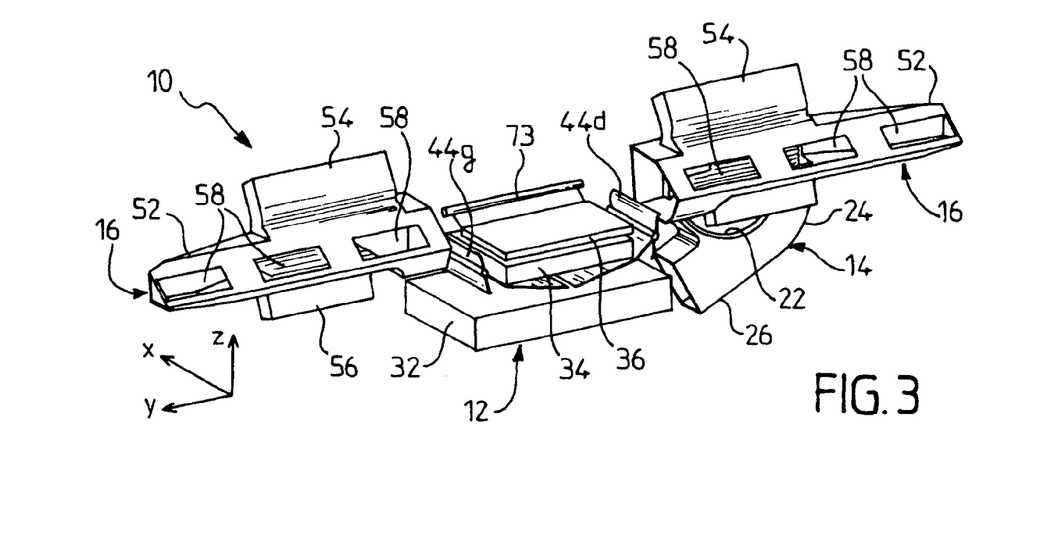
FIG. 3 is a perspective view in which the device in FIG. 1 is separated.

Reference is made firstly to FIGS. 1 and 3 together, which show a heating-ventilation and/or air-conditioning device for the passenger compartment of a motor vehicle. The device, which is designated in its entirety by reference 10, consists essentially of several modules grouped substantially at the same horizontal level. FIG. 3 also shows the three regular axes of a vehicle, namely the longitudinal axis (X-axis), the transverse axis (Y-axis) and the vertical axis (Z-axis). The device includes a heating module 12 designed to be installed in a central area of the passenger compartment, a ventilation module 14 located next to the heating module, and two distribution modules 16 designed to be installed on the left and right sides, respectively, of the heating module. As can be seen in FIGS. 1 and 3, the heating module 12, the ventilation module 14 and the two distribution modules 16 are located substantially at the same horizontal level and in the same transverse direction (Y-axis) of the vehicle. Grouping of several modules at the same horizontal level thus frees space in the lower and upper central position, thereby enabling the device to be placed in a vehicle without a central console. Moreover, this leaves a large space on the dashboard, in particular for navigation devices or other equipment.

The ventilation module 14 is placed next to the heating module 12, in the transverse direction (Y-axis) of the vehicle. It includes an air inlet unit (not shown in FIG. 1) suitable for being supplied with outside air and/or recirculated air, a filter (not shown) for filtering the air flow and a turbine 22 for producing a pulsed air flow. This turbine 22 is housed in a volute casing 24, extended by an outlet channel 26 for leading the filtered and pulsed air flow to an inlet 28 of the heating module. This inlet 28 is located in the lower portion of the heating module so that the air is sent into the heating module in a generally vertical and ascending direction as shown by the arrow F1 in FIG. 1.

Figure 2:
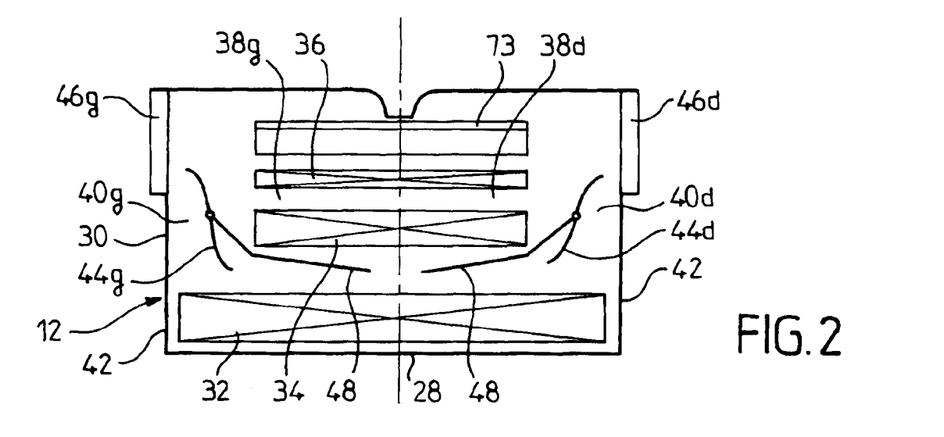
FIG. 2 shows the heating module of the device in FIG. 1.

The heating module 12 (FIGS. 1 to 3) includes a housing 30 with a general parallelepiped shape, and the inlet 28 is formed in the lower surface of the housing. The housing holds several heat exchangers for processing the air flow coming from the ventilation module. The housing holds, from bottom to top, an evaporator 32, a heating radiator 34 through which a heat transfer fluid (normally the liquid for cooling the vehicle engine) passes, and an electric heating radiator 36.

In the example, the evaporator 32 and the two radiators 34 and 36 extend in substantially horizontal planes. However, such an arrangement is not limiting. The evaporator can be placed in any chosen position from a horizontal position to a vertical position. The heating radiator 34, which is placed downstream of the evaporator, can be placed in any chosen position from a position parallel to the evaporator to a position perpendicular to it. The electric heating radiator 36, which is optional, is placed downstream of the heating radiator 34 preferably parallel or at a slight incline thereto. The radiator 36 preferably includes positive temperature coefficient resistors (PTCR).

The heating module 12 also includes adjusting means for producing an air flow at an adjusted temperature by mixing, in a variable proportion, a warm air flow that has passed through the heating radiators 34 and 36 and a cold air flow that has bypassed the heating radiator. These adjusting means include, on the right and left sides of the heating module 12, a side warm air channel 38d and 38g, respectively, each passing through one half of the heating radiators 34 and 36 and a side cold air channel 40d and 40g, respectively, bypassing the side warm air channel. As can be seen more specifically in FIG. 2, the radiators 34 and 36 have a horizontal width smaller than the horizontal width of the evaporator 32 and smaller than the width of the housing 30 as defined by two side walls 42.

A side mixing flap 44d and 44g, respectively, is provided in the housing for distributing, in a variable proportion, the warm air flow in the side warm air channel and the cold air flow in the cold air channel. On each side of the heating module 12, the side warm air channel 38d (or 38g) and the side cold air channel 40d (or 40g) jointly form a side outlet 46d and 46g, respectively, of the heating module. In the example, each of the side mixing flaps 44d and 44g is located in the heating module, which thus includes the mixing function. It should be understood that the air first passes through the evaporator, then separates into two flows respectively assigned to the right and left portions. In each of the portions or halves, the temperature of the air flow is adjusted by mixing, in a variable proportion, a cold air flow and a warm air flow. Thus, the temperature of the air flow sent into the two distribution modules 16 can be adjusted independently.

In the example, the mixing flaps are shown schematically. They primarily include two butterfly-type flaps between which a gate flap 48 extends, and is located between the evaporator 32 and the heating radiator.

The two distribution modules 16 are located on the right and left sides, respectively, of the heating module. Each has an inlet 50 connected to a side air outlet 46d or 46g of the heating module. Each distribution module 16 is in the form of an elongated casing 52 that in each case occupies a portion of the vehicle dashboard. This elongated casing 52 defines an internal chamber that supplies several air outlets: an outlet 54 directed upwards, an outlet 56 directed downwards and three intermediate outlets or frontal outlets 58. The upper outlet 54 is suitable for supplying at least one defrosting/defogging duct of the windshield, while the lower outlet 56 is suitable for supplying at least one foot-heating duct in the lower portion of the passenger compartment. Finally, the outlets 58 supply ventilation flaps arranged essentially in the vehicle dashboard. Each of the modules 16 includes distribution means, which are described below, for distributing the air flow among the aforementioned outlets depending on the desires of the vehicle occupant(s).

Figure 4:
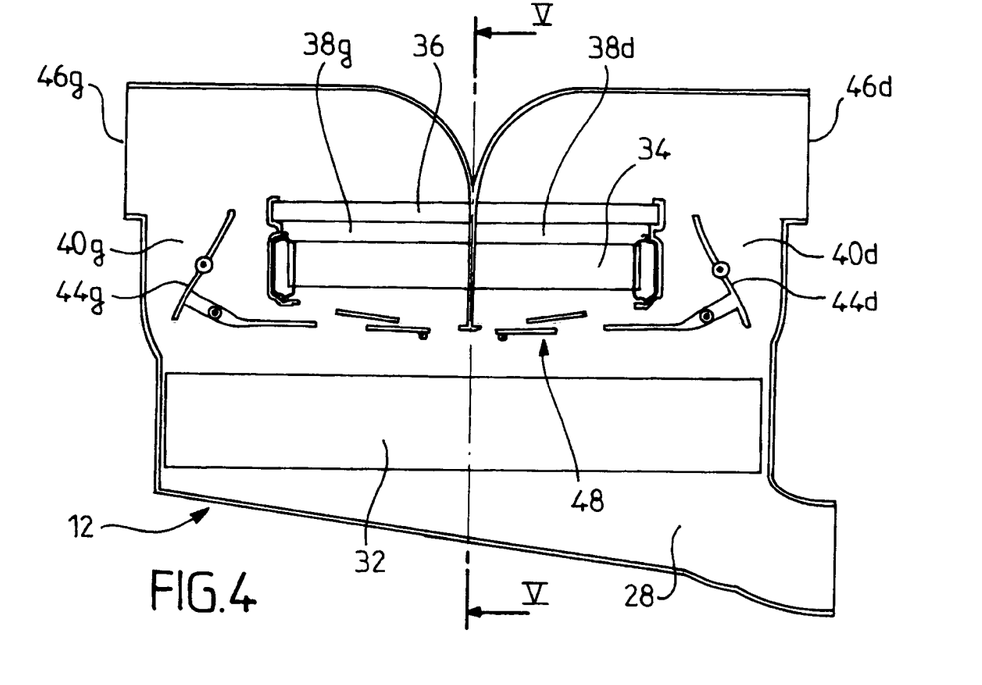
FIG. 4 is a vertical cross-section view of the heating module of the device in FIGS. 1 and 3.

FIG. 4 is a view identical to that in FIG. 3 showing the components of the heating module 12 in more detail.

Figure 6:
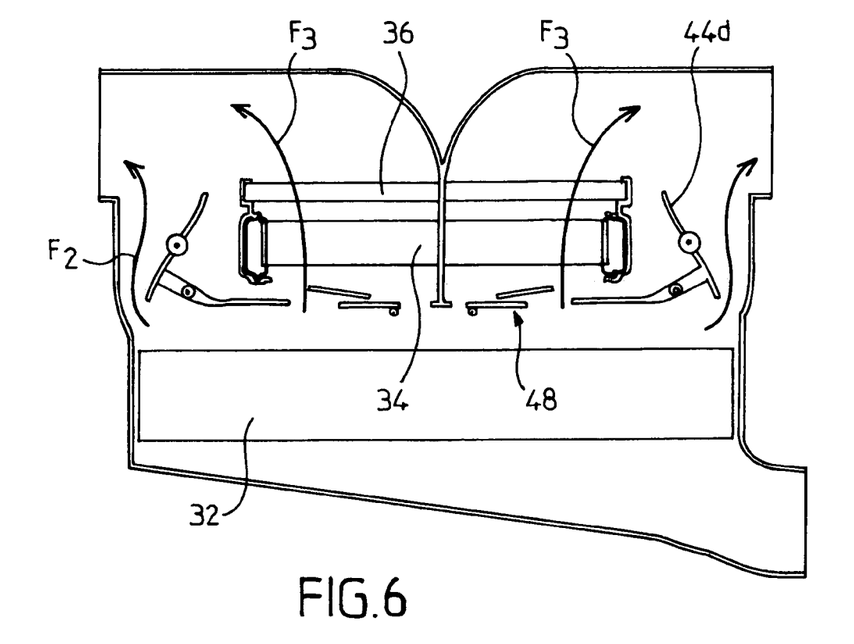
FIG. 6 schematically shows the circulation of air in the upper portion of the heating module in FIG. 4.

As can be seen in FIG. 6, the function of mixing the cold air flow F2 and the warm air flow F3 is performed on each side of the heating module 12, but the actual mixing is performed in a mixing chamber 60 which is located in each distribution module 16, and more specifically at the inlet of each of them. However, in an alternative embodiment (not shown), the mixing function could be completely transferred to each of the distribution modules. In this case, the mixing flaps would be located completely in the distribution modules.

Figure 5:
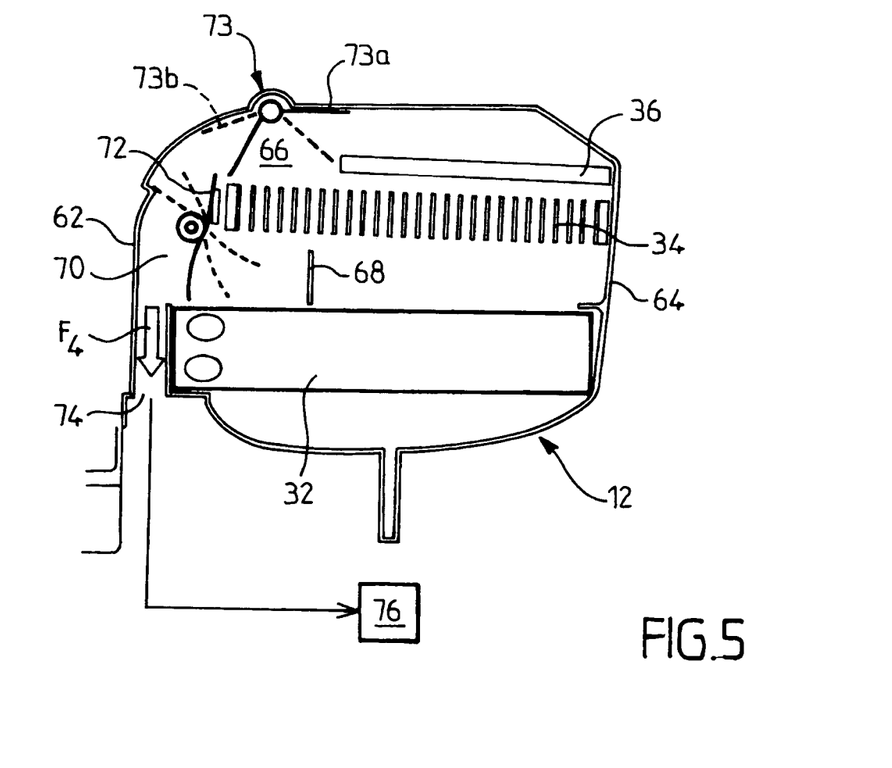
FIG. 5 is a cross-section view according to line V-V in FIG. 4.

The cross-section view in FIG. 5 shows the evaporator 32 as well as the two radiators 34 and 36. The casing of the heating module 12 is limited by an anterior wall 62 located on the side of the vehicle engine compartment and by a posterior wall 64 located on the side of the passenger compartment. The adjusting means include a central warm air channel 66 limited by a partition 68 for distributing a portion of the air flow to the rear of the casing. In addition, a central cold air channel 70 bypasses the central warm air channel. A central mixing flap 72 is placed in the casing to enable the cold air flow and the warm air flow to be varied in an adjustable proportion and to obtain an air flow at an adjusted temperature, which is sent into a channel as shown by the arrow F4. This supplies an outlet 74 of the heating module. The outlet in turn supplies at least one other distribution module 76 (shown schematically) for distributing an air flow at an adjusted temperature to the rear of the passenger compartment. Here, again, the mixing function for this other distribution module can be moved inside it.

The device in FIG. 5 also includes a distribution flap 73 that can move between a first position 73a (shown with a solid line) for sending the air flow at an adjusted temperature to the side outlets of the heating module which supply the front of the passenger compartment, and a second position 73b (shown with a dotted line) for sending the air flow at an adjusted temperature to the central outlet 74 supplying the rear of the passenger compartment. This enables the heating-ventilation or air-conditioning functions to be selectively favoured either in the front or the rear of the passenger compartment.

The rear distribution module(s) distribute air to distribution outlets placed in the rear of the vehicle for sending air through aerators, lower distribution outlets and toward the side windows of the vehicle.

Figure 7:
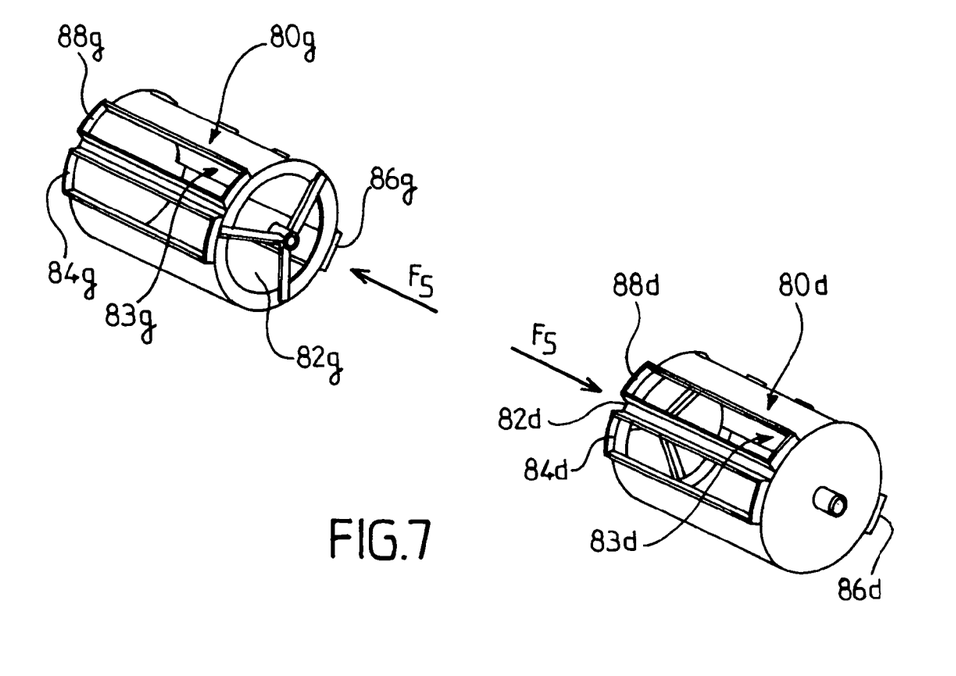
FIG. 7 is a perspective view showing two distribution satellites forming part of the distribution modules.

Reference is now made to FIG. 7, which shows an example of distribution means housed inside distribution modules 16. Each of the distribution modules 16 includes a cylindrical casing 80d and 80g, respectively, comprising an axial inlet 82d and 82g, respectively, for the air flow to be distributed. Each casing houses a cylindrical flap 83d and 83g, respectively, of which the angular position enables three outlets to be selectively opened or closed. These outlets include an outlet 84d and 84g, respectively, to the aerators, an outlet 86d and 86g, respectively, to the feet and an outlet 88d and 88g, respectively, to the base of the windshield for defrosting/defogging it. The distribution means in FIG. 7 can be included in the type of device shown in FIGS. 1 and 3.

Figure 8:
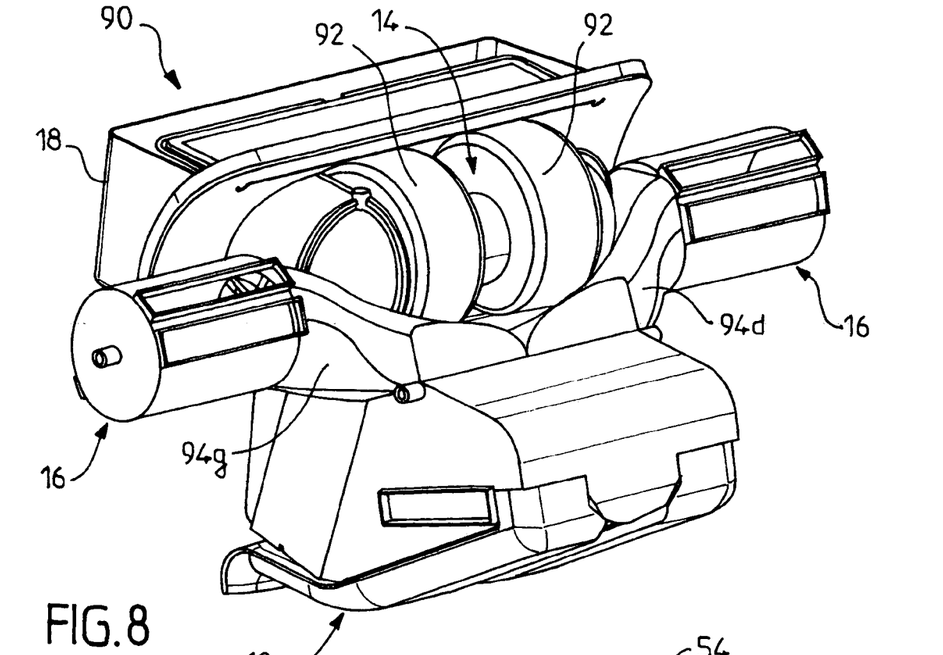
FIG. 8 is a perspective view of a device according to an embodiment of the invention.

However, they are advantageously integrated in a device 90, according to another embodiment of the invention, as shown in FIG. 8. This device 90 is similar to device 10 in FIGS. 1 to 3. It also comprises a heating module 12 placed in a central position and two distribution modules 16 located on the right and left sides, respectively and produced as defined above in reference to FIG. 7. However, unlike the first embodiment described, the ventilation module 14 here occupies a central position. It is also located next to the heating module 12, but in the longitudinal direction (X-axis) of the vehicle. It comprises a double turbine 92 with a transverse rotation axis. The ventilation module 14 can be located either in the engine compartment, or in the passenger compartment or between them.

FIG. 8 also shows the air inlet unit 18 that supplies the turbines and is normally located under a grille (not shown), referred to as a "water separator" placed in front of the base of the windshield. The side outlets of the heating module are connected to the distribution modules 16 by two air ducts 94d and 94g, respectively.

Figure 9:
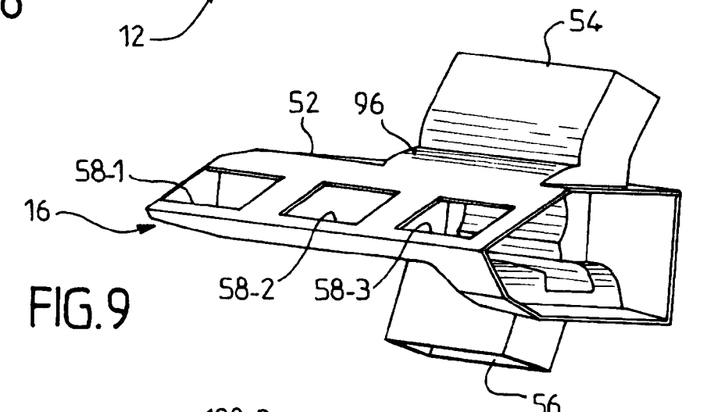
FIG. 9 is a perspective view of a distribution module.
Figure 10:
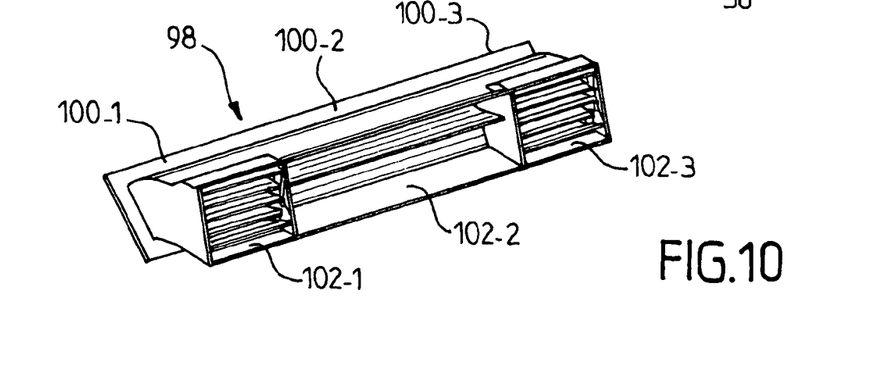
FIG. 10 is a perspective view showing distribution ducts suitable for fitting the distribution module in FIG. 9.

The distribution module 16 in FIG. 9 is similar to those shown in FIG. 3. It includes an elongated casing 52 supplied with air and comprising a cylindrical portion 96 housing a cylindrical flap (not shown) similar to that in FIGS. 7 and 8. The flap controls the distribution of air among an upper outlet 54 supplying windshield defrosting/defogging ducts, a lower outlet 56 directed toward the bottom of the passenger compartment and three frontal outlets 58-1, 58-2 and 58-3. The frontal outlets are housed in the dashboard. The aforementioned flap is not capable of controlling the outlets 58-1 to 58-3. This function is provided by an air diffuser, shown in FIG. 10, which includes three inlets 100-1, 100-2 and 100-3 which form an interface with the outlets 58-1 to 58-3, respectively. Each of these diffusers includes its own adjusting means. The diffuser 98 comprises outlet ducts 102-1, 102-2 and 102-3 and is mounted on the casing 52 of the distribution module 16.

Figures 11, 12:
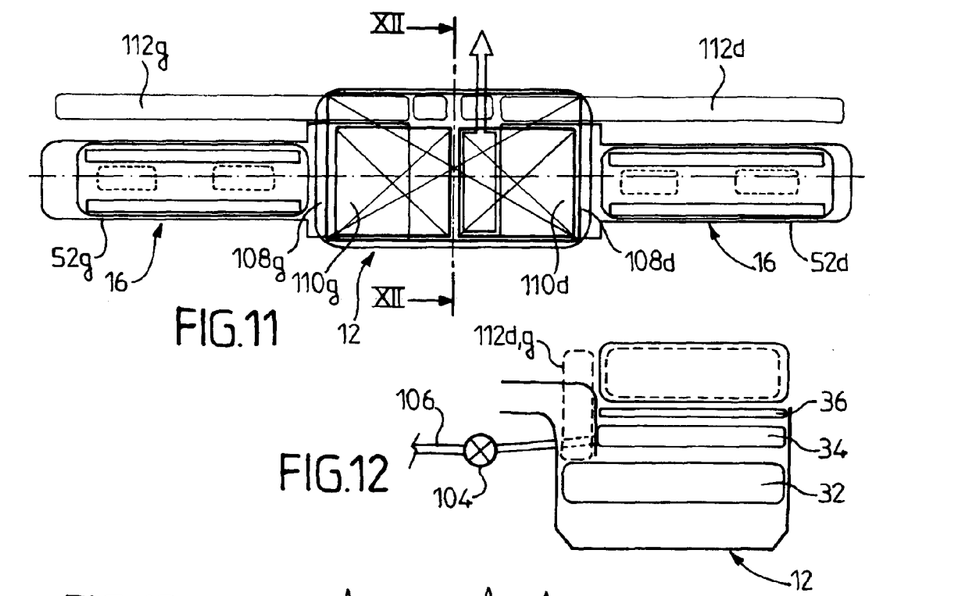
FIG. 11 is a schematic horizontal cross-section view of another device according to the invention, in which the air flow at an adjusted temperature is obtained by adjusting the temperature of the coolant that passes through the heating radiator.
FIG. 12 is a cross-section view according to line XII-XII in FIG. 11.

Reference is now made to FIGS. 11 and 12, which schematically show another embodiment of the invention, in which the temperature is adjusted by varying the flow of coolant that passes through the radiator 34. This is obtained by adjusting the position of at least one adjusting valve 104 mounted on a channel 106 that supplies the radiator 34 with a coolant (FIG. 12). The device includes two side outlet chambers 108 that are located downstream of the radiators 34 and 36 and which supply the casings 52g and 52d, respectively of the two distribution modules. The heating module 12 is divided into two heating zones 110d and 110g respectively assigned to the distribution modules. In this type of device, the different outlets of the two distribution modules are supplied with air at the same temperature. To avoid this disadvantage, at least one side cold air channel 112d and 112g is provided for directly leading a cold air flow from the heating module 12, upstream of the air of the heating radiator 34, to a distribution module 16 located on the right or left side. This enables the intermediate air outlets and/or the upper air outlets to be supplied with cold air in order to create a temperature stratification.

Figure 13:
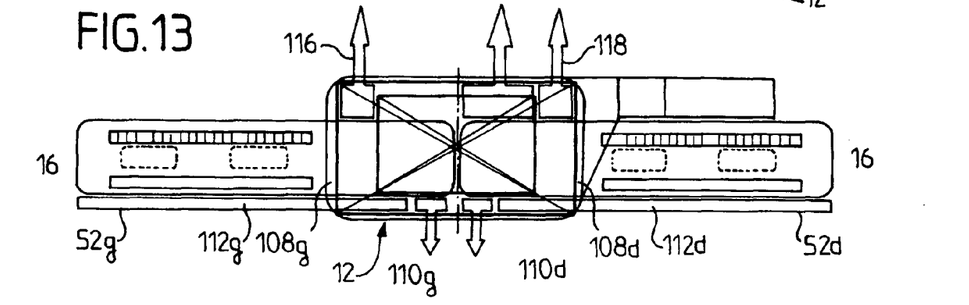
FIG. 13 is a view identical to that in FIG. 11 in an alternative embodiment.

In the alternative embodiment in FIG. 13, the temperature is adjusted by mixing the cold air flow with the warm air flow that has passed through the radiator 34, obtained by adjusting the position of at least one adjusting flap 44d, 44g and 48. The other elements of the device are identical to those defined above in reference to FIGS. 11 and 12.

In this embodiment, the sizes of the two side cold air channels 112d and 112g are smaller than those of the embodiment shown in FIGS. 11 and 12.

This enables space to be cleared for two other cold air channels 116 and 118 which can be provided for other functions, such as cooling electrical components or cooling a bottle compartment or the glove compartment of the vehicle.

The embodiment shown in FIGS. 11 and 12 also has a central outlet chamber located downstream of the heating radiator and leading to a central outlet of the heating unit, and arranged to supply at least one other distribution module toward the rear of the passenger compartment. A central cold air channel can also be provided to directly lead a cold air flow from the heating unit, upstream of the heating radiator, to the other distribution module located in the rear of the vehicle.

Figure 14:
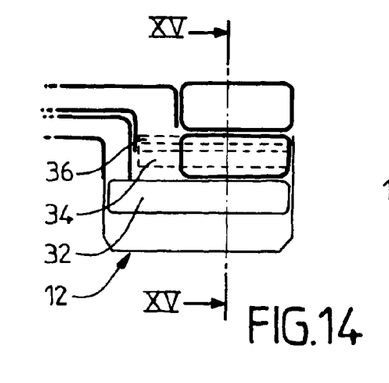
FIG. 14 is a vertical cross-section view of a heating module according to another embodiment.
Figure 15:
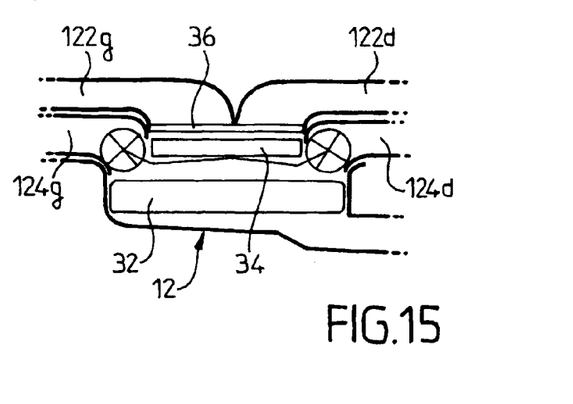
FIG. 15 is a cross-section view according to line XV-XV in FIG. 14.

In the embodiment in FIGS. 14 and 15, each distribution module 16 includes a casing 52d and 52g, respectively, identical to those in FIG. 13. However, each of the casings is divided into a warm air duct 122d and 122g, respectively, and a cold air duct 124d and 124g, respectively. The two warm air ducts are connected to the outlet of the heating radiators 34 and 36, while the cold air ducts are connected to the outlet of the evaporator 32. The mixture of warm air and cold air thus takes place directly in each of the distribution modules 16 with suitable flaps (not shown).

Figures 16, 17, 18:
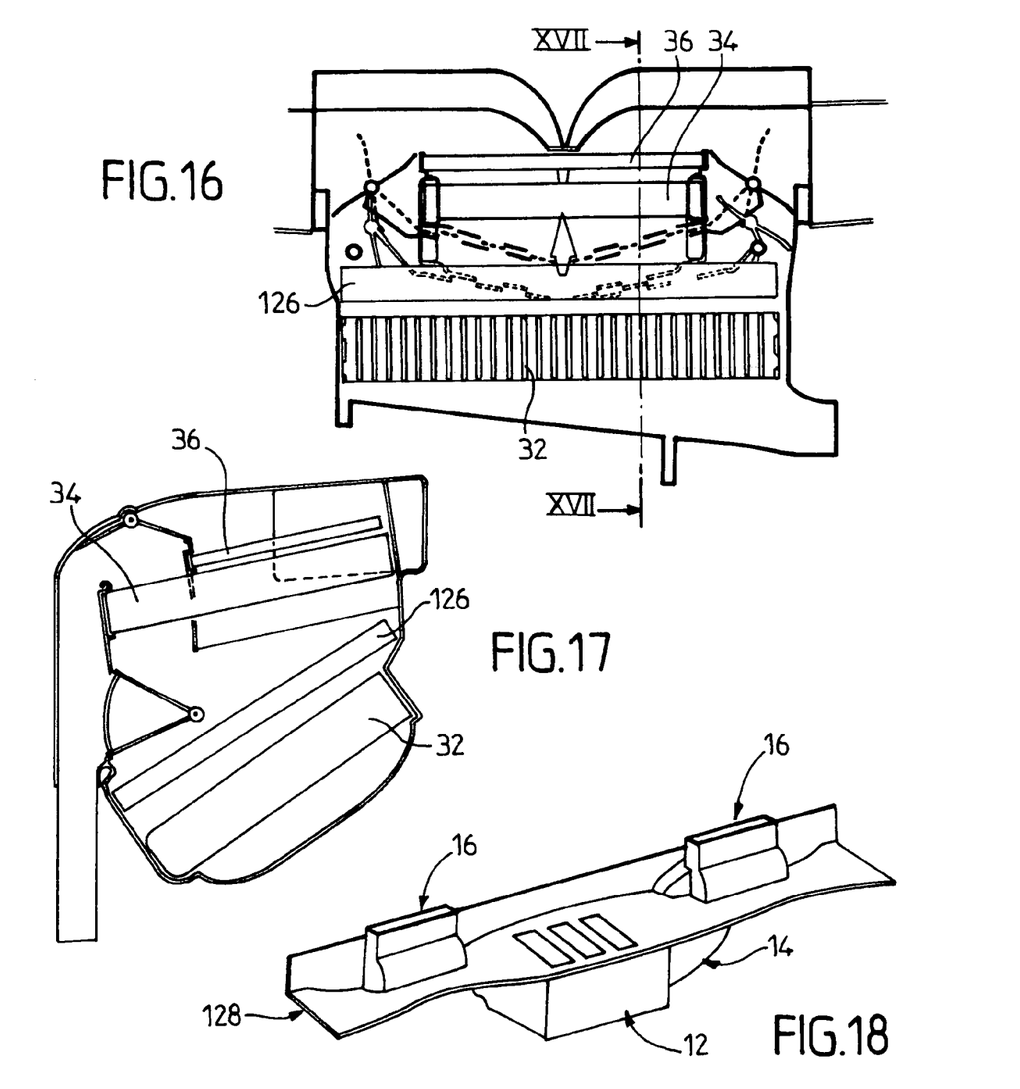
FIG. 16 is a cross-section view identical to that in FIG. 4 in an alternative embodiment.
FIG. 17 is a cross-section view according to line XVII-XVII in FIG. 16.
FIG. 18 is a perspective view of a transverse beam including a device according to the invention, with the parts forming a cover for the distribution modules removed.

Reference is now made to FIGS. 16 and 17. In this embodiment, a photocatalysis module 126 is located downstream of the evaporator in order to treat the odours created by it. This module 126 is placed above the evaporator 32. The horizontal, or near-horizontal, position of the evaporator makes it easier to place this photocatalysis module 126 between the evaporator 32 and the heating radiator 34. In the example shown, the evaporator 32 and the photocatalysis module 126 are both inclined, each forming an angle between 20° and 40° with respect to the horizontal (FIG. 17).

In most of the aforementioned embodiments, each of the distribution modules is supplied by a single air duct, which means that the air outlets are at the same temperature. To overcome this disadvantage, it is possible, as shown earlier, to add cold air channels to create a temperature stratification with two or three levels. It is also possible to create a fixed stratification by dividing each air duct into a warm air duct and a cold air duct.

Another solution involves transferring the heat sources to the inside of each of the distribution modules 16, or directly into the ducts supplying the lower outlets (food outlets) or upper outlets (defrosting/defogging outlets) in order to heat these outlets to a temperature above that of the aeration outlets.

Figure 19:
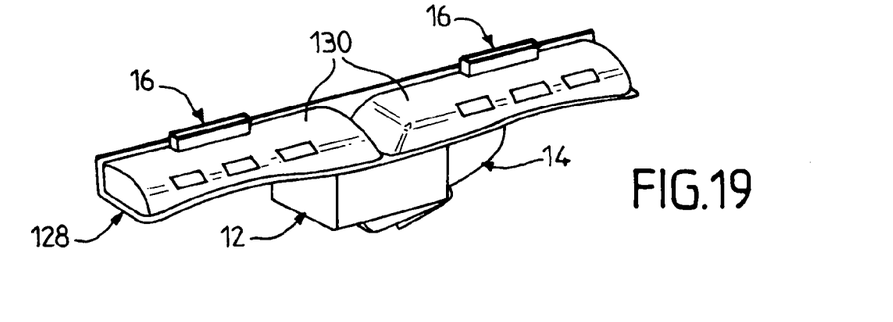
FIG. 19 is a view identical to that in FIG. 18, with the parts forming the cover in place.

Reference is now made to FIG. 18, which shows the integration of the heating module 12, the ventilation module 14 and the two distribution modules 16 in a transverse beam 128 of the vehicle. The transverse beam 128 can directly form at least a portion of the distribution modules 16. The latter each include a cover 130 which is then placed over the beam 128 (FIG. 19) to close the respective air ducts of the two modules 16.

The modular design of the device of the invention, with modules located substantially at the same horizontal level, facilitates its instalment in a motor vehicle without a console.

The invention claimed is:
1. A device for heating-ventilation and/or air-conditioning a passenger compartment of a motor vehicle, including means for producing an air flow at an adjusted temperature, as well as air outlets for defrosting, aeration and foot-warming which are supplied by this adjusted air flow and are suitable for being connected to ducts leading into the passenger compartment, characterized in that the device comprises at least one ventilation module (14), at least one heating module (12), and two distribution modules (16) grouped substantially at the same horizontal level;

said at least one ventilation module (14) arranged to produce the air flow;

said at least one heating module (12) comprising a housing (30) connected to said ventilation module (14) and disposed between said two distribution modules (16), an air inlet (28) in said housing (30) for the air flow, heat exchangers (32, 34, 36) disposed in said housing (30) through which the air flow can pass, and two side air outlets (46d, 46g) in said housing (30); and said two distribution modules (16) each having a casing (52) with an inlet (50) connected to said side air outlets (46d, 46g), respectively, of the heating module (12), said two side air outlets (46d, 46g) being spaced from each other along an axis that extends through said housing (30), and said two distribution modules (16) each extending from said heating module (12) in opposite directions along said axis;

said distribution modules (16) including an upper outlet (54) suitable for supplying at least one defrosting/defogging duct of the windshield, a lower outlet (56) suitable for supplying at least one foot-heating duct in the lower portion of the passenger compartment, and an intermediate outlet (58) suitable for supplying at least one ventilation duct in the vehicle dashboard; and said distribution modules (16) comprising distribution means disposed within said casing (52) for distributing the air flow and configured to selectively open and close the upper outlet (54) and/or the lower outlet (56) and/or the intermediate outlet (58), for leading the air flow to selected areas of the passenger compartment.

2. A device according to one of claim 1, characterized in that the heating module (12) extends along a longitudinal axis and the ventilation module (14) is placed next to the heating module (12) along the longitudinal axis.

3. A device according to claim 1, characterized in that the ventilation module (14) includes an air inlet unit (18) for outside air and/or recirculated air, a blower (22) for producing the air flow, and an outlet channel (26) for leading the air to the inlet (28) of the heating module.

4. A device according to one of claim 1, characterized in that the inlet (28) of the heating module (12) is located in a lower portion thereof, and in that the heating module (12) houses, from the lower portion to a top portion of said heating module (12), an air-conditioning evaporator (32) and at least one heating radiator (34, 36).

5. A device according to claim 4, characterized in that the heating module (12) houses a first heating radiator (34) through which a heat transfer fluid passes, placed between the evaporator (12), and said top of said heating module (12), as well as a second electric heating radiator (36) placed between the first heating radiator (34) and said top of said heating module (12).

6. A device according to one of claims 4 and 5, characterized in that the evaporator (32) and the heating radiator (34) each extend along a plane inclined at an angle between 0° and 90° with respect to the horizontal.

7. A device according to claim 6, characterized in that the evaporator (32) extends along a plane inclined at an angle between 20° and 40° with respect to the horizontal.

8. A device according to claim 1, characterized in that it includes adjusting means (44d, 44g, 48) for producing an air flow at an adjusted temperature resulting from mixing, in a variable proportion, a warm air flow that has passed through the heating radiator (34, 36) and a cold air flow that has bypassed the heating radiator (34, 36).

9. A device according to claim 8, characterized in that the adjusting means in each case include a side warm air channel (38d, 38g) passing through a portion of the heating radiator (34, 36) and a side cold air channel (40d, 40g) bypassing the side warm air channel, as well as a side mixing flap (44d, 44g) for distributing, in a variable proportion, the warm air flow in the side warm air channel and the cold air flow in the side cold air channel, with the side warm air channel (38d, 38g) and the side cold air channel (40d, 40g) jointly forming a side outlet (46d, 46g) of the heating module.

10. A device according to claim 9, characterized in that each side mixing flap (44d, 44g) is located in the heating module (12).

11. A device according to claim 9, characterized in that each side mixing flap is located in one of the distribution modules (16), which is located on sides of the heating module (12).

12. A device according to claim 8, characterized in that the adjusting means also include a central air channel (66) for warm air that has passed through a portion of the heating radiator (34, 36) and a central air channel (70) for cold air that has bypassed the central air channel (66), as well as a central mixing flap (72) for distributing, in a variable proportion, the air flow going to the central warm air channel (66) and the air flow in the central cold air channel (70), with the two central channels (66, 70) jointly forming a central outlet (74) of the heating module (12) arranged for supplying at least one other distribution module (76) for distributing an air flow at an adjusted temperature to the rear of the passenger compartment.

13. A device according to claim 12, characterized in that the central mixing flap (72) is located in the heating module (12).

14. A device according to claim 12, characterized in that the central mixing flap (72) is located in the other distribution module (76).

15. A device according to one of claims 12 to 14, characterized in that the adjusting means also include a distribution flap (73) that can move between a first position (73a) to send the air flow at an adjusted temperature to the side outlet(s) (46d, 46g) of the heating module (12) supplying the front of the passenger compartment, and a second position (73b) for sending the air flow at an adjusted temperature to the central outlet (74) of the heating module (12) supplying the rear of the passenger compartment.

16. A device according to claim 1, characterized in that it includes two side outlet chambers (108d, 108g) located downstream of the heating radiator (34, 36) and respectively leading to the side outlets (46d, 46g) of the heating module.

17. A device according to claim 16, characterized in that it also includes at least one side cold air channel (112d, 112g) for directly leading a cold air flow from the heating module (12), upstream of the heating radiator (34), to one of the distribution modules (16) located on a side of said heating module (12).

18. A device according to claim 16, characterized in that it also includes a central outlet chamber located downstream of the heating radiator (34, 36) and leading to a central outlet of the heating unit (12), and arranged to supply at least one other distribution module (76) for distributing an air flow at an adjusted temperature to the rear of the passenger compartment.

19. A device according to claim 12, characterized in that it also includes at least one central cold air channel for directly leading a cold air flow from the heating module (12), upstream of the heating radiator (34), to the other distribution module (76) or to a compartment to be cooled.

20. A device according to claim 1, characterized in that it includes adjusting means (104) acting on the flow, and therefore the temperature, of a coolant passing through the heating radiator (34) for producing an air flow at an adjusted temperature.

21. A device according to claim 20, characterized in that it includes two side outlet chambers (108*d*, 108*g*) located downstream of the heating radiator (34, 36) and respectively leading to the side outlets (46*d*, 46*g*) of the heating module.

22. A device according to claim 21, characterized in that it also includes at least one side cold air channel (112*d*, 112*g*) for directly leading a cold air flow from the heating module (12), upstream of the heating radiator (34), to a distribution modules (16) located on a side of said heating module (12).

23. A device according to claim 21, characterized in that it also includes a central outlet chamber located downstream of the heating radiator (34, 36) and leading to a central outlet of the heating unit (12), and arranged to supply at least one other distribution module (76) for distributing an air flow at an adjusted temperature to the rear of the passenger compartment.

24. A device according to claim 21, characterized in that it also includes at least one central cold air channel for directly leading a cold air flow from the heating module (12), upstream of the heating radiator (34), to the other distribution module (76) or to a cooling compartment.

25. A device for heating-ventilation and/or air-conditioning a passenger compartment of a motor vehicle, said device comprising:
at least one ventilation module (14), at least one heating module (12), and two distribution modules (16) grouped substantially at the same horizontal level;
said at least one ventilation module (14) arranged to produce air flow;
said at least one heating module (12) comprising a housing (30) connected to said ventilation module (14) and disposed between said two distribution modules (16), an air inlet (28) in said housing (30) for the air flow, heat exchangers (32, 34, 36) disposed in said housing (30) through which the air flow can pass, and two side air outlets (46*d*, 46*g*) in said housing (30);
said two distribution modules (16) each having a casing (52) with an inlet (50) connected to said side air outlets (46*d*, 46*g*), respectively, of said heating module (12), said two side air outlets (46*d*, 46*g*) being spaced from each other along an axis that extends through said housing (30), and said two distribution modules (16) each extending from said heating module (12) in opposite directions along said axis;
said two distribution modules (16) each including an upper outlet (54) suitable for supplying at least one defrosting/defogging duct of the windshield, a lower outlet (56) suitable for supplying at least one foot-heating duct in the lower portion of the passenger compartment, and an intermediate outlet (58) and/or the intermediate outlet (58);
said two distribution modules (16) each comprising distribution means disposed within said casing (52) and configured to selectively open and close the; the upper outlet (54) and/or the lower outlet (56) and/or the intermediate outlet (58); and
said heating module (12) comprising at least one side air outlet (46*d*, 46*g*) with at least one distribution module (16) arranged to be placed on a side of said heating module, said two distribution modules (16) each having an inlet (50) connected to said side air outlet (46*d*, 46*g*) of said heating module;
wherein said inlet (28) of said heating module (12) is located in a lower portion thereof and wherein said heating module (12) houses, from the lower portion to a top portion of said heating module (12), an air-conditioning evaporator (32) and at least one heating radiator (34, 36).

\* \* \* \* \*